3,314,984
SYNTHESIS OF HALOGEN-CONTAINING NITRITES

Nathan Mayes, Ironia, and Ronald Michaels, Boonton, N.J., assignors to Thiokol Chemical Corporation, Bristol, Pa., a corporation of Delaware
No Drawing. Filed June 3, 1966, Ser. No. 555,015
6 Claims. (Cl. 260—467)

This invention relates to synthesis of halogen-containing nitrites. In one aspect, the invention relates to preparation of fluorine-containing acyl and diacyl nitrites.

Acyl and diacyl nitrites have previously been prepared by reaction of a silver salt of the fluorocarbon acid with nitrosyl chloride, or by reaction of a fluorocarbon acid anhydride with either nitrosyl chloride or nitrogen sesquioxide. The primary utility of the fluorocarbon nitrites is as a precursor for synthesis of nitroso compounds, which in turn are intermediates for nitroso polymer formation. Nitroso polymers are useful as greases, waxes and elastomers.

It has been discovered that halogen-containing nitrites may be prepared by the reaction of a fluorocarbon acid halide with nitrogen sesquioxide. Among the advantages of preparing acyl and diacyl nitrites from fluorocarbon acid halides as disclosed herein are the greater availability and lower cost of the acid halides as compared to the acid anhydrides or silver salts. These advantages are particularly important in the case of perfluoroglutaryl chloride, the precursor for perfluoroglutaric acid as well as for perfluoroglutaric anhydride. In accordance with the present invention halogen-containing nitrites may be produced directly from fluorocarbon acid halides, without the delay and expense of converting the halides to the acid anhydride or metal salt.

It is therefore an object of this invention to provide a novel process for preparation of halogen-containing acyl and diacyl nitrites.

A further object of this invention is to provide a method for economical preparation of halogen-containing acyl and diacyl nitrites directly from fluorocarbon acid halides.

Another object of this invention is to provide a process whereby halogen-containing acyl and diacyl nitrites are prepared from readily available and relatively inexpensive intermediates.

The starting materials for the new process are nitrogen sesquioxide and a perfluoroalkyl acyl or diacyl chloride. A typical reaction is as follows:

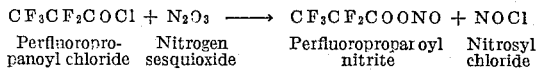

| Perfluoropro- | Nitrogen | Perfluoropropar oyl | Nitrosyl |
| panoyl chloride | sesquioxide | nitrite | chloride |

Some examples of acyl and diacyl chlorides that may be used are:

Perfluorooctanoyl chloride   Perfluoroacetyl chloride
Perfluoropropanoyl chloride  Perfluorobutanoyl chloride
Perfluoroglutaryl chloride   Perfluoropentanoyl chloride
Perfluorosuccinyl chloride   Perfluorohexanoyl chloride
Perfluoroadipyl chloride     Perfluoromalonyl chloride The reactants are brought together at reduced temperature, the nitrogen sesquioxide being in the liquid state. The mixture is maintained at autogenous pressure and warmed as the reaction proceeds. Unreacted statring material and volatile by-products are removed by evaporation at low pressure.

Solely by way of example, some examples illustrating the invention will be described.

*Example I.—Preparation of perfluoroglutaryl dinitrite*

Into a 500 ml. Pyrex flask, fitted with a Dry Ice condenser, addition funnel, magnetic stirrer, and nitrogen blanket was condensed, at liquid nitrogen temperature, 7.6 g. (0.1 mole) of $N_2O_3$. A 13.9 g. (0.05 mole) quantity of perfluoroglutaryl chloride was then added at liquid nitrogen temperature, the mixture was allowed to warm to $-5°$ C., and this temperature was maintained for 3 hours with stirring. The temperature of the mixture was then raised to 25° C. and kept at this temperature for 16 hours. Unreacted starting materials and volatile by-products were removed by evaporation at 25° C. and 0.1 mm. of mercury pressure. The product was a yellow crystalline solid having a melting point of 45–47° C. Infrared analysis of the product exhibited broad absorption bands in the region of 5.1 microns for —NO and in the region of 5.9 microns for the carbonyl of an acyl nitrite. This infrared spectrum is identical to that exhibited by a sample of perfluoroglutaryl dinitrite prepared by reaction of perfluoroglutaric anhydride and $N_2O_3$.

*Example II.—Preparation of perfluoroglutaryl dinitrite*

Into a 2 liter Pyrex flask, equipped with a Dry Ice condenser, magnetic stirrer, nitrogen blanket and a liquid addition tube, was charged 820 g. (2.9 moles) of perfluoroglutaryl chloride. The flask was cooled to $-5°$ C. and 538 g. (7.0 moles) of liquid $N_2O_3$ was added through the addition tube, which tube extended below the surface of the liquid. The mixture was stirred 3 hours at $-5°$ C. and then allowed to warm to 25° C. Upon removal of unreacted $N_2O_3$ the product did not crystallize and an incomplete reaction was apparent. The aforementioned addition of $N_2O_3$ and following procedure were repeated, yielding 730 g. (2.45 moles) of perfluoroglutaryl dinitrite (83% yield).

*Example III.—Preparation of perfluoroadipyl nitrite*

Into a 250 ml. flask cooled to $-70°$ C. and equipped with a magnetic stirrer, Dry Ice condenser, addition funnel and nitrogen blanket was charged 15.4 g. (0.2 mole) of liquid $N_2O_3$. To this was added, through the addition funnel, 27 g. (0.075 mole) of perfluoroadipyl chloride and the temperature was increased to 0° C. where it was maintained with stirring for 2 hours. The mixture was allowed to warm to 25° C. and volatiles allowed to escape. Last traces of volatiles were removed at reduced pressure leaving a yellow solid product. The infrared spectrum exhibited absorptions in the regions 5.1 and 5.9 microns indicative of the diacylnitrite derivative.

*Example IV.—Preparation of perfluoropropanoyl nitrite*

Into a 100 ml. Pyrex flask, fitted with a Dry Ice condenser, nitrogen blanket, magnetic stirrer and a liquid addition tube, was charged 5 g. (0.027 mole) of perfluoropropanoyl chloride at $-75°$ C. To this, at the same temperature, was added 5 g. (0.066 mole) of $N_2O_3$. The mixture was warmed to 0° C. and stirred at this temperature for 2 hours. Excess $N_2O_3$ and volatile by-product were removed by evaporation. The process gave a 91% yield of a yellow viscous liquid, which by infrared analysis was identified as perfluoropropanoyl nitrite.

What is claimed is:

1. A process for preparing aliphatic halogen-containing acyl and diacyl nitrites comprising contacting nitrogen sesquioxide with a compound selected from the group consisting of perhaloalkyl acyl chloride, perhaloalkyl diacyl chloride, and a mixture thereof.

2. A process as defined in claim 1 wherein said compound is perfluoroglutaryl chloride.

3. A process as defined in claim 1 wherein said compound is perfluoropropanoyl chloride.

4. A process as defined in claim 1 wherein said compound is perfluoroadipyl chloride.

5. A process as defined in claim 1 wherein the reactants are contacted under an inert atmosphere.

6. A process as defined in claim 4 wherein the reactants are contacted at temperatures ranging from about $-195.8°$ C. to about $25°$ C. at autogenous pressure.

References Cited by the Examiner

UNITED STATES PATENTS 3,192,247  6/1965  Crawford et al. ----- 260—466

OTHER REFERENCES

Banks et al.: Proc. Chem. Soc. (London), February 1965, pp. 64–5.

CARL D. QUARFORTH, *Primary Examiner.*

L. A. SEBASTIAN, *Assistant Examiner.*